US011590883B2

(12) United States Patent
Ratliff, Sr.

(10) Patent No.: US 11,590,883 B2
(45) Date of Patent: Feb. 28, 2023

(54) BOAT LOADERS FOR WATERCRAFT TRAILERS

(71) Applicant: Daniel Corey Ratliff, Sr., Gulf Shores, AL (US)

(72) Inventor: Daniel Corey Ratliff, Sr., Gulf Shores, AL (US)

( * ) Notice: Subject to any disclaimer, the term of this patent is extended or adjusted under 35 U.S.C. 154(b) by 0 days.

(21) Appl. No.: 17/694,998

(22) Filed: Mar. 15, 2022

(65) Prior Publication Data

US 2022/0297595 A1 Sep. 22, 2022

Related U.S. Application Data

(60) Provisional application No. 63/162,456, filed on Mar. 17, 2021.

(51) Int. Cl.
*B60Q 1/30* (2006.01)
*F21S 4/28* (2016.01)
*B60Q 1/26* (2006.01)
*F21V 31/00* (2006.01)
*F21Y 115/10* (2016.01)

(52) U.S. Cl.
CPC ........... *B60Q 1/305* (2013.01); *B60Q 1/2696* (2013.01); *F21S 4/28* (2016.01); *F21V 31/005* (2013.01); *F21Y 2115/10* (2016.08)

(58) Field of Classification Search
CPC ..... B60Q 1/305; B60Q 1/2696; F21V 31/005; F21S 4/28
See application file for complete search history.

(56) References Cited

U.S. PATENT DOCUMENTS

| | | | | |
|---|---|---|---|---|
| 4,715,768 | A * | 12/1987 | Capps | B60P 3/1075 414/535 |
| 7,891,691 | B2 * | 2/2011 | Bearey | B60D 1/36 116/28 R |
| 10,889,239 | B2 * | 1/2021 | Washington | B60Q 1/0483 |
| 11,041,610 | B1 * | 6/2021 | Smith | F21V 21/30 |
| 11,414,003 | B1 * | 8/2022 | Reynolds | B60Q 1/305 |
| 2013/0111988 | A1 * | 5/2013 | Newton | G01F 23/76 73/293 |
| 2016/0347247 | A1 * | 12/2016 | Espey | B60Q 1/52 |

* cited by examiner

*Primary Examiner* — Arman B Fallahkhair
(74) *Attorney, Agent, or Firm* — Thomas | Horstemeyer, LLP

(57) ABSTRACT

Various examples are provided related to boat loaders for trailers. In one example, a boat loader includes a primary tube extending between a first end and a second end and a light tube that can move within the primary tube. The light tube can include light elements extending along a portion of the light tube at a first end and a float attached to the light tube at a second end. The primary tube can be coupled to a trailer at the second end and the first end of the light tube can extend outward from the first end of the primary tube exposing the light elements as the primary tube is submerged in water and can retract into the primary tube as the primary tube is removed from the water.

19 Claims, 5 Drawing Sheets

BOAT LOADERS FOR WATERCRAFT TRAILERS

CROSS REFERENCE TO RELATED APPLICATIONS

This application claims priority to, and the benefit of, U.S. provisional application entitled "Lightning Boat Loaders" having Ser. No. 63/162,456, filed Mar. 17, 2021, which is hereby incorporated by reference in its entirety.

BACKGROUND

Marine trailers are used to transport a wide range of watercraft such as boats, jet skis or other types of watercraft. In general, the marine trailers include a frame supported by an axle assembly with bunks comprising rails and/or rollers to support the watercraft. However, as the trailer is backed into the water it is difficult to know where the end of the trailer is located for loading the boat or other watercraft onto the trailer.

SUMMARY

Aspects of the present disclosure are related to boat loaders for watercraft trailers. In one aspect, among others, a boat loader comprises a primary tube extending between a first end and a second end, the primary tube configured to be coupled to a trailer at the second end; and a light tube configured to move within the primary tube, the light tube comprising: light elements extending along a portion of the light tube at a first end; and a float attached to the light tube at a second end. The first end of the light tube extends outward from the first end of the primary tube exposing the light elements as the primary tube is submerged in water and retracts into the primary tube as the primary tube is removed from the water. In one or more aspects, the boat loader can comprise a light strip including the light elements. The light strip can be mounted inside the light tube. The light strip can be attached to an inner surface of the light tube. The light tube can be a clear light tube. The light tube can comprise polycarbonate. The lighting elements can be light emitting diodes.

In various aspects, the light tube can comprise a light tube top sealing the first end of the light tube and a light tube base sealing the second end of the light tube base. The boat loader can comprise power connection wiring configured to connect to a lighting system of the trailer, the power connection wiring coupled to the light elements and extending through the light tube base and the float. The float can be attached to the light tube base by an adhesive. The float can be attached in a recess of the light tube base. The float can comprise a closed cell foam. A light tube cap can be attached to the first end of the light tube over the light tube top. The light tube cap can comprise one or more light element. The one or more light element can be electrically coupled to a lighting system of the trailer through the light tube top. In one or more aspects, the primary tube can comprise a primary tube cap attached to the first end of the primary tube, wherein the light tube passes through a tube opening in the primary tube cap. The tube opening can substantially center the light tube in the primary tube. The primary tube can comprise a channel extending along a portion of the primary tube and the light tube can comprise a tab extending radially outward from the second end of the light tube and engaged with the channel. The tab can be a screw extending through the channel and attached to the second end of the light tube. The light tube can comprise a light tube base attached to the second end of the light tube base and the screw is engaged with the light tube base.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
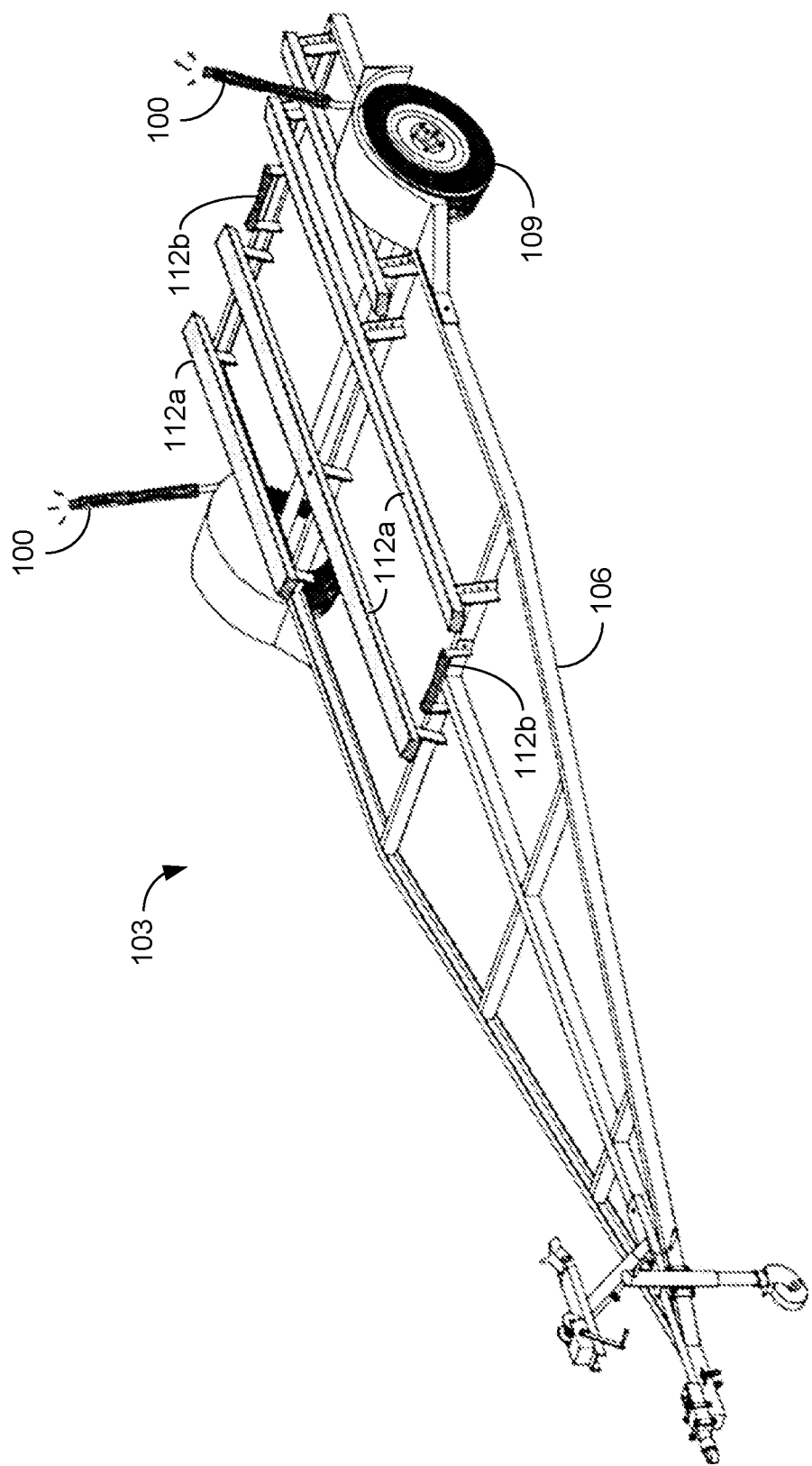
FIGS. 1A and 1B illustrate an example of a trailer including boat loaders, in accordance with various embodiments of the present disclosure.

Disclosed herein are various examples related to boat loaders for watercraft trailers. Light from the boat loader can help guide the watercraft onto the trailers. The Reference will now be made in detail to the description of the embodiments as illustrated in the drawings, wherein like reference numbers indicate like parts throughout the several views.

Boat Loaders are designed to assist in the ease of guiding watercraft onto their appropriate trailer. The boat loaders can be placed at the back and/or down the sides of the marine trailer to serve as a "runway" to light the path for marine vessels to be easily guided onto the trailer during loading. In addition, the lighting provided by the boat loaders can assist with aligning the trailer with the boat ramp as it is backed into the water for loading or unloading. This can be beneficial at any time but especially during darker hours.

The lights of the boat loaders can be located at various positions on and/or in the boat loader. For example, lights can be located inside guide poles mounted on the trailer. The boat loaders can be configured so that the deeper the trailer goes into the water the higher the lights (e.g., a strip of light emitting diode (LED) elements) come out of the guide poles for the user to see. For instance, as the trailer is backed into the water (e.g., at night) the lights extend to assist with alignment as the trailer moves down the boat ramp and to aid in loading (or unloading) the watercraft onto the trailer. When the trailer is pulled out of the water the lights can retract back inside the guide poles leaving, e.g., top lights to use as marker or guide lights to see the outside edge of the watercraft trailer while traveling at night.

Figure 1B:
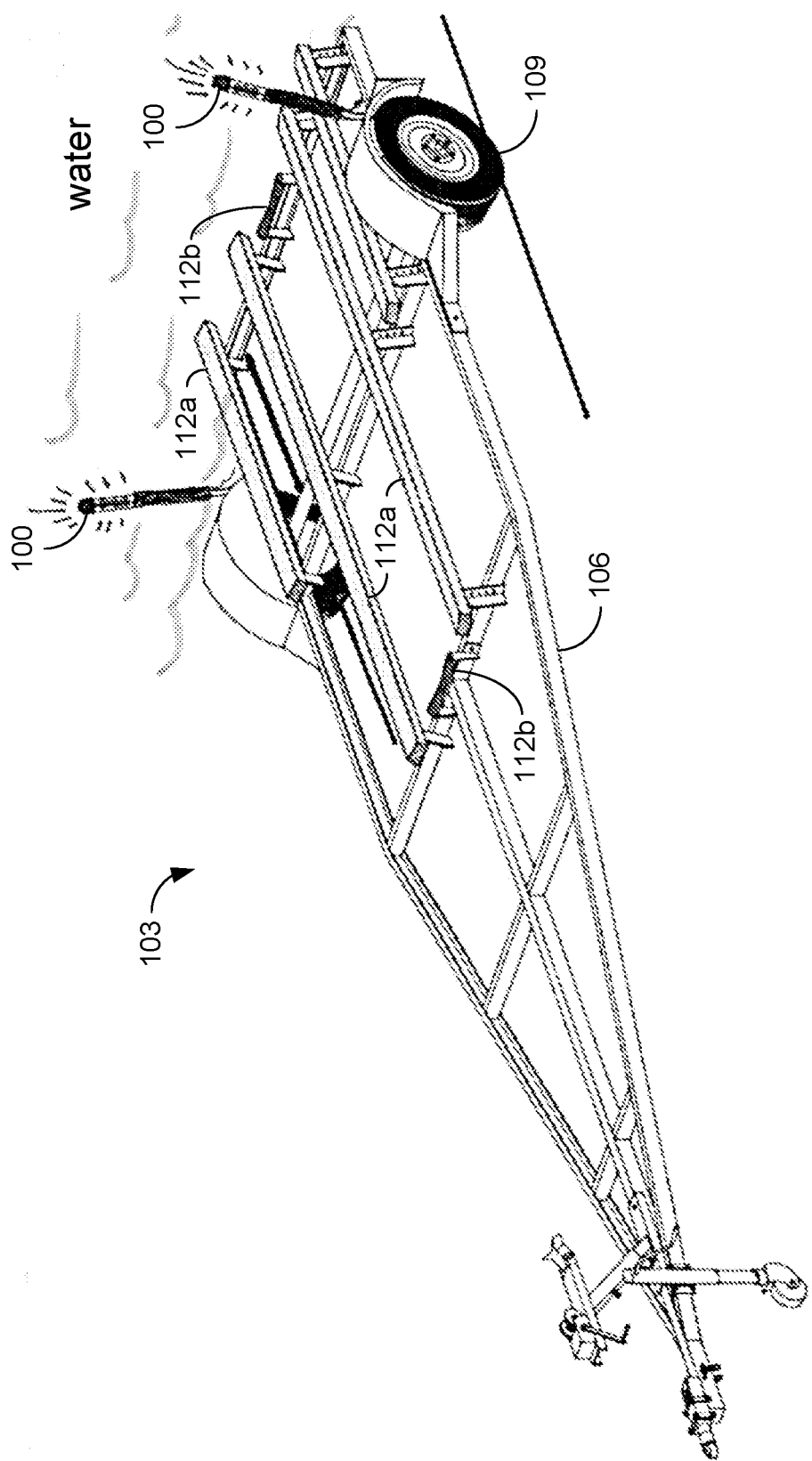

FIGS. 1A and 1B illustrate an example of boat loaders 100 on a boat trailer 103. The boat trailer 103 comprises a frame 106 supported by wheels 109 that attaches to a vehicle at a proximal end by a hitch or other appropriate attachment fixture. The frame 106 provides support for rails 112a and/or rollers 112b upon which the watercraft is loaded and rests for transport. Boat loaders 100 can be mounted at one or more locations along one or both sides of the trailer 103. For example, boat loaders 100 can be mounted on opposite sides of the frame 106 at a distal end and/or distributed along the sides of the frame 106 between the distal and proximal ends.

As shown in FIG. 1A, two boat loaders 100 are mounted on opposite sides of the frame 106 of the trailer 103 adjacent to the wheels 109 of the trailer 103. The boat loaders 100 are attached to the frame 106 in a vertical orientation or at an angle from vertical so that the boat loader 100 tapers outward. This allows for clearance between the boat loader 100 and the hull of the watercraft. For example, boat loaders can be mounted at an angle in a range from about zero to about 20 degrees from vertical, about zero to about 30 degrees from vertical, or about zero to about 45 degrees or more from vertical. Angling the boat loaders 100 outward away from the frame 106 can also improve visibility of the lights on the boat loader 100 to a driver of the vehicle transporting the trailer 103.

The boat loaders 100 include lights that can illuminate to provide guidance. The boat loaders 100 can include lights that extend along a length of the boat loader 100, on an end of the boat loader 100 and/or at other appropriate location. In the example of FIG. 1A, lights at the top of the boat loaders 100 are visible while the trailer is out of the water. The two top lights can act as "running" lights at night, which can indicate the outside of the trailer 103 when driving down the road. As the trailer 103 is backed into the water and the boat loaders 100 are submerged, lights on the boat loaders 100 are extended above the water as shown in FIG. 1B to provide guidance. As the boat loader 100 extends upward, the top light remains over the water. In addition, the boat loader 100 can include lights as will be discussed that are exposed as the boat loader 100 extends upward. The lights allow both sides of the trailer 103 to be seen at night making it easier to load the boat or other watercraft on the trailer 103.

Figure 2A:
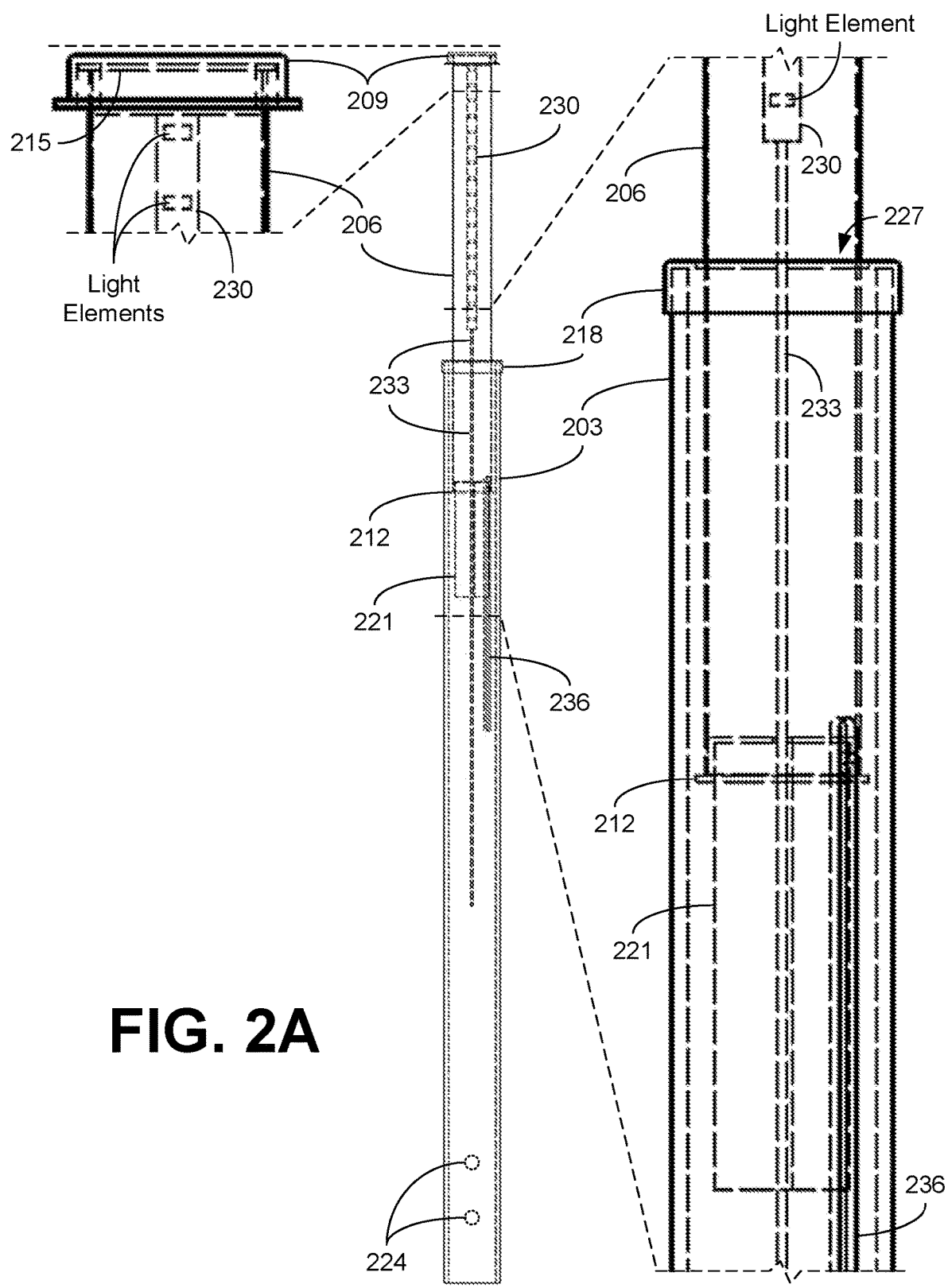
FIGS. 2A-2C illustrate an example of a boat loader, in accordance with various embodiments of the present disclosure.
Figure 2B:
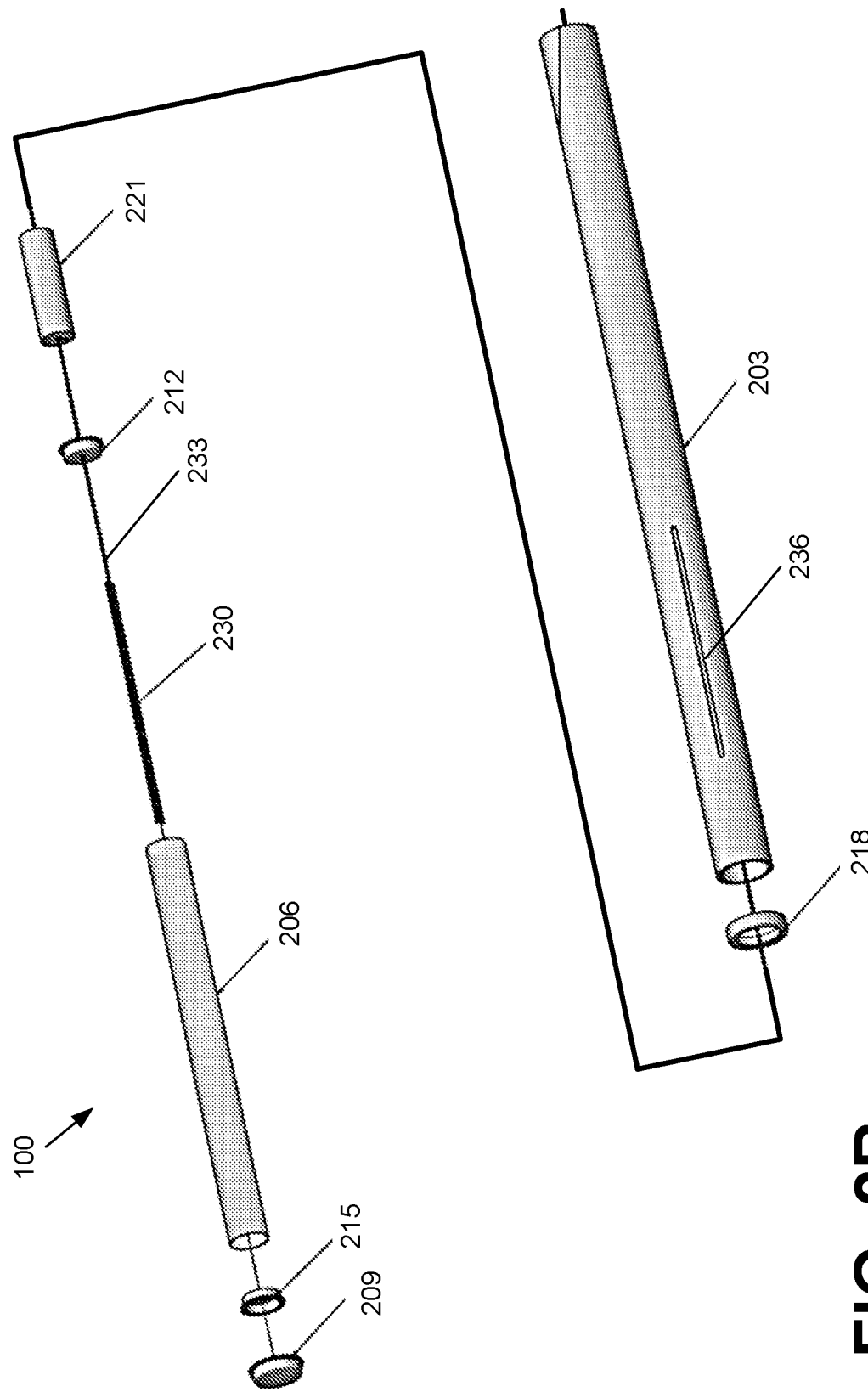
Figure 2C:
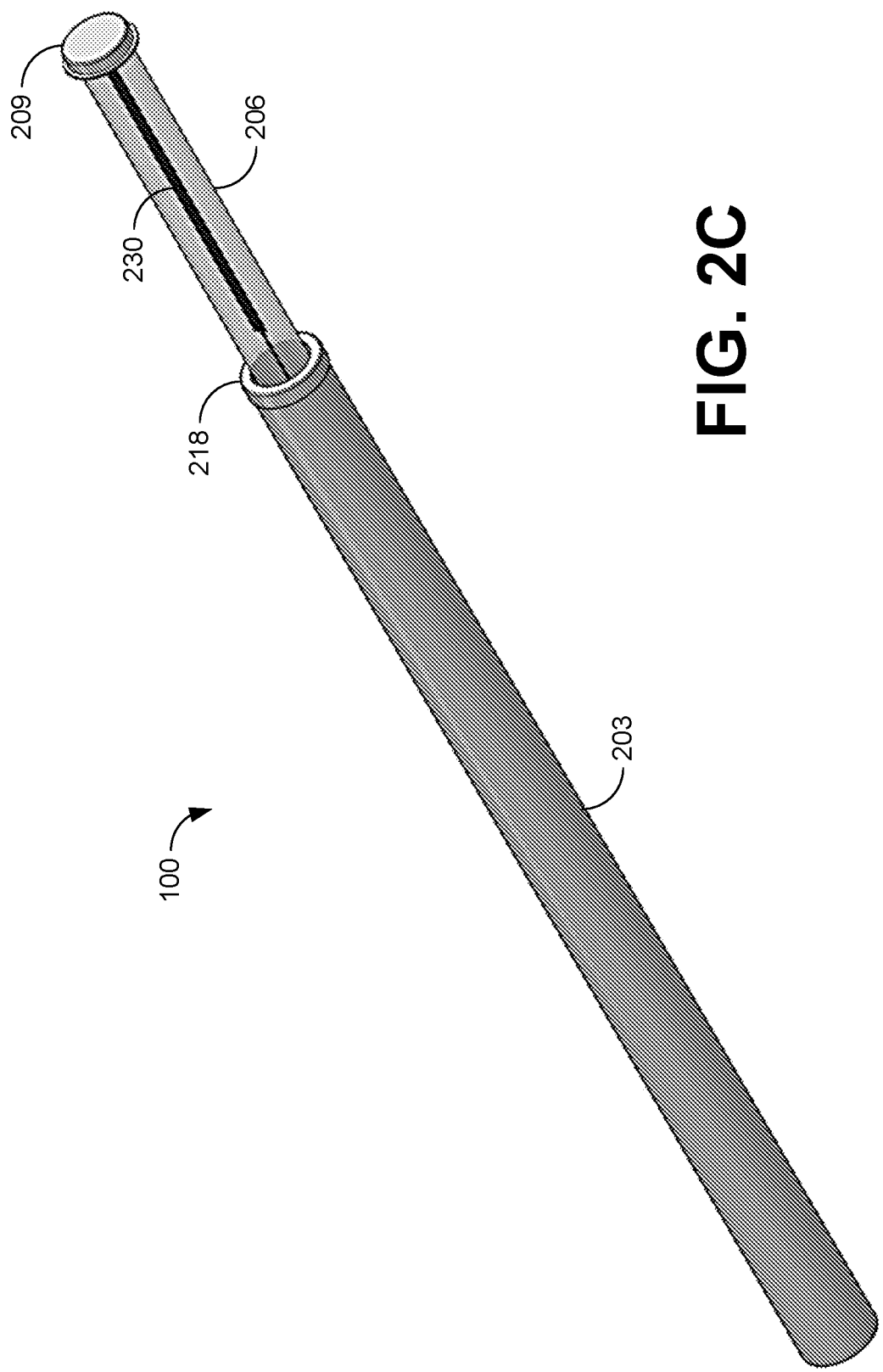

Referring to FIGS. 2A-2C, shown is an example of a boat loader 100. FIG. 2A shows a cross-sectional view of the boat loader 100, FIG. 2B shows an exploded view illustrating the components of the boat loader 100, and FIG. 2C is a perspective view of the boat loader 100. The boat loader 100 includes a primary tube 203 and a light tube 206 positioned within the primary tube 203. The light tube 206 can include a light tube cap 209 attached at a first end of the light tube 206 and a light tube base 212 attached at a second end of the light tube 206. The light tube 206 can include a light tube top 215 at the first end of the light tube 206 to facilitate sealing of the light tube 206 and/or attachment of the light tube cape 209. The primary tube 203 can include a primary tube cap 218 attached at a first end of the primary tube 203. The light tube 206 passes through the primary tube cap 218, which is configured to hold the light tube 206 in position within the primary tube 203 while allowing the light tube 206 to extend from and retract into the primary tube 203 during operation. A float 221 can be attached to the light tube base 212 to provide buoyancy and lift to extend the light tube 206 as the primary tube 203 is submerged in water.

The primary tube 203 can be a pipe or tube in which the light tube 206 moves. In FIGS. 2A-2C, the primary tube 203 is shown with a circular cross-sectional shape, but other appropriate cross-sectional shapes can be used (e.g., rectangular, square, hexagonal, or other geometric shape). The primary tube 203 can be formed of polyvinyl chloride (PVC), fiberglass, metal (e.g., aluminum, stainless steel, etc.), or other appropriate material that can be resistant to or treated to resist corrosion. For example, the primary tube 203 can be a schedule 40 PVC pipe. The primary tube 203 is sized to receive the light tube 206 (e.g., a 2-inch pipe) and allow its movement during operation. The primary tube can be configured to attach the boat loader 100 to the trailer 103 by, e.g., one or more fastener opening 224, attachment fixture or bracket that can be attached to the primary tube 203 and the frame 106 of the trailer 103 (FIGS. 1A and 1B).

The primary tube 203 can also act as a bumper or guide for loading the boat or other watercraft onto the trailer 103. The primary tube 203 can be configured to withstand the forces experienced during loading and unloading. In some embodiments, the primary tube 203 can be reinforced and/or padded to protect the primary tube 203. For example, the primary tube 203 can include ribs or ridges extending along its length (e.g., along the inner and/or outer surface of the primary tube). Padding can be provided around the outer surface (or at least a portion) of the primary tube 203 using rubber, foam, or other appropriate material.

The primary tube 203 can include a primary tube cap 218 on the first end and can be open at the second end to allow water to enter the primary tube 203 as it enters the water and exit as the boat loader 100 is removed from the water. The primary tube cap 218 can include a tube opening 227 in the middle of the cap that allows the light tube 206 to pass through the primary tube cap 218 to enter and exit the primary tube 203 and move within the primary tube. The primary tube cap 218 can be formed of PVC, fiberglass, metal (e.g., aluminum, stainless steel, etc.), or other appropriate material compatible with the material of the primary tube 203. The primary tube cap 218 is sized to be attached to the primary tube 203 and to accommodate a tube opening 227 sized to accommodate the light tube 206 (e.g., a 2-inch pipe cap with a 1.75-inch opening substantially centered in the pipe cap). The primary tube cap 218 can be fixedly or detachably attached to the first end of the primary tube 203. For example, the primary tube cap 218 can be attached to the primary tube 203 using adhesive (e.g., PVC glue), brazing, welding or other appropriate attachment method or can be coupled to the primary tube 203 using threading, latches, rivets, screws, or other appropriate connectors or fastening methods, which can utilize sealing components (e.g., washers, O-rings, etc.) to seal the light tube 206.

The tube opening 227 can help maintain the light tube 206 in the center of the primary tube 203. The primary tube cap 218 can give additional stability to the light tube 206 as it is guided in and out of the primary tube 203. The primary tube cap 218 also helps to capture a portion of the air in the primary tube 203 when it is filling up with water to make the light tube 206 rise out of the primary tube 203 as the trailer 103 (FIGS. 1A and 1B) enters the water and is submerged. The primary tube cap 218 can also act as a stop or limiter when the light tube retracts back into the primary tube 203. In a fully retracted position, the light tube cap 209 can engage the primary tube cap 218 to prevent further movement and/or support the light tube 206 after returning into the primary tube 203.

The light tube 206 can be a pipe or tube which moves in the primary tube 203. The light tube 206 is sized (e.g., a 1.65-inch tube) to pass through the tube opening 227 and allow its movement during operation. In FIGS. 2A-2C, the light tube 206 is shown with a circular cross-sectional shape corresponding to the tube opening 227 in the primary tube cap 218, but other appropriate cross-sectional shapes can be used (e.g., rectangular, square, hexagonal, or other geometric shape). The light tube 206 can be formed of polycarbonate, plastic, PVC, fiberglass, metal (e.g., aluminum, stainless steel, etc.), or other appropriate material that can be resistant to or treated to resist corrosion.

The light tube 206 can include one or more lights that can be illuminated to indicate the location of the boat loader 100, and thus the trailer 103 it is attached to. For example, the light tube 206 can include a light strip 230 located within a clear (or semi-clear) light tube 206 made of, e.g., polycarbonate. The light strip 230 can comprise one or more LED or other appropriate light element extending along a length of the light tube 206. The light elements can be colored (e.g., red) as desired. In other embodiments, the light tube 206 can include one or more light element (e.g., LED) mounted in or on the light tube 206. The light tube 206 can include light elements mounted around and/or along the inner or outer surface of the light tube. For instance, the light strip 230 can be a light strip of marine LED lights with self-adhesive tape strip along the back of the light strip itself. The light stripe 230 can be attached to an inner surface of the light tube 206 with the adhesive tape strip or other adhesive or fastening method.

The light tube 206 can be sealed at first and second ends to maintain the internal pressure of the light tube 206 and keeping weather elements out. A light tube top 215 can be attached to the first end of the light tube 206 and a light tube base 212 can be attached to the second end of the light tube 206. The light tube top 215 and/or light tube base 212 can be formed of polycarbonate, plastic, PVC, fiberglass, metal (e.g., aluminum, stainless steel, etc.), or other appropriate material compatible with the material of the light tube 206. The light tube top 215 and light tube base 212 are sized to be attached to the light tube 206 (e.g., a 1.5-inch internal pipe cap). The light tube top 215 and/or light tube base 212 can be fixedly or detachably attached to the first end of the light tube 206. For example, the light tube top 215 and/or light tube base 212 can be attached to the light tube 206 using adhesive (e.g., PVC glue) or other appropriate attachment method or can be coupled to the primary tube 203 using threading or other appropriate connectors or fastening methods, which can utilize sealing components (e.g., washers, O-rings, etc.) to seal the light tube 206.

The light tube 206 can also include a light tube cap 209 attached over the first end of the light tube 206. The light tube cap 209 can be formed of polycarbonate, plastic, PVC, fiberglass, metal (e.g., aluminum, stainless steel, etc.), or other appropriate material compatible with the material of the light tube 206. The light tube cap 209 is sized to be attached to the light tube 206 (e.g., a 2-inch pipe cap). The light tube cap 209 can be fixedly or detachably attached to the first end of the light tube 206. For example, the light tube cap 209 can be attached to the light tube 206 and/or the light tube top 215 using adhesive (e.g., PVC glue) or other appropriate attachment method or can be coupled to the primary tube 203 using threading or other appropriate connectors or fastening methods, which can utilize sealing components (e.g., washers, O-rings, etc.) to seal the light tube 206.

The light tube cap 209 can provide additional sealing for the light tube 206. In addition, the light tub cape 209 can be configured to provide a larger diameter to help keep the light tube 206 from passing through and out of the bottom of the primary tube 203 when the light tube 206 retracts as the trailer 103 is pulled from the water. In some embodiments, the light tube cap 209 can include one or more light element (e.g., LEDs) that can provide illumination when the light tube 206 is not extended from the primary tube 203. The light tube cap 209 can be clear or transparent allowing light from the light elements in the light tube cap 209 to be seen in any position. The shape of the light tube cap 209 can be configured to direct light from the light elements in desired directions. In some cases, the light tube cap 209 and light tube top 215 can be clear or transparent allowing light from the light strip 230 to be seen through the light tube cap 209. The light tube cap 209 can include the reflective elements configured to direct at least a portion of the light out of the sides of the light tube cap 209.

The light strip 230 can be supported by the light tube top 215 and extend through the light tube 203 as shown in FIGS. 2A-2C. Power connection wiring 233 can extend from the light strip 230 through the light tube base 212 for attachment to the trailer lighting system. If there are light elements in the light tube cap 209, then the power connection wiring can extend from the light strip 230 through an opening in the light tube top 215 to supply, e.g., LEDs in the light tube cap 209. The light tube base 212 can include an opening (e.g., a 0.2-inch hole) centered (or substantially centered) in the light tube base 212. The wiring 233 from the light strip 230 can pass through the opening of the light tube base 212 and through the primary tube 203 to be hooked up to the trailer lights (e.g., running and/or brake lights) of the trailer 103. The wiring 233 can extend through the second end of the primary tube 203 or through an opening in the side of the primary tube 203 for connection to the trailer lights. The openings in the light tube top 209 and light tube base 212 can be sealed to maintain internal pressure in the light tube 206.

A float 221 is attached to the light tube base 212 to provide buoyancy and lift to extend the light tube 206 as the boat loader 100 is submerged in water. The float 221 can comprise a closed cell foam or other appropriate float structure such as, e.g., a gas filled chamber. The closed cell foam can be, e.g., polystyrene foam attached to the light tube base 212 with an adhesive (e.g., clear silicone), casing or other appropriate fastening method. As shown in the example of FIG. 2A, the float 221 can be secured within a recess of the light tube base 212. The light tube base 212 seals the bottom of the light tube 206 and once the float 221 is attached to the bottom of the light tube base 212 (e.g., with silicone), it also prevents water from getting into the light tube 206 when submerged into the water. The float 221 can provide the buoyancy needed for the light tube 206 to properly extend out of the primary tube 203 and work effectively. The float 221 can be sized to provide the desired lift while fitting within the primary tube 203.

As the trailer 103 enters the water and the boat loader 100 is submerged in the water, the light tube 206 glides out of the primary tube 203 because of the buoyancy the float 221 provides. The light tube base 212 can also include a tab such as, e.g., a stainless screw that extends from a side of the light tube base 212 and engage with a channel 236 that extends along a portion of the length of the primary tube 203. The tab in the channel 236 can limit movement of the light tube 206 in the primary tube 203 and prevent it from coming out completely if the primary tube 203 was to be submerged too far into the water. The channel 236 extends along a predefined length of the primary tube 203 (e.g., a length from about 9 inches to about 12 inches, or to about 11 inches, or a length of about 10.375 inches) and width (e.g., 0.25 inch). The tab is configured to give the light tube 206 the capability of sliding up and down channel 236 in the primary tube 203, maintaining orientation of the light tube 206 in the primary tube 203 and guiding and/or stopping the light tube 206 at the limits of the channel 236. As the trailer 103 is pulled out of the water, the light tube 206 recedes back into the primary tube 203 again with the tab and channel 236 maintaining alignment in the primary tube 203. Other features can be included to limit the movement of the light tube 206 within the primary tube 203. For example, the light tube 206 can include a shoulder or ridge that extends around at least a portion of the light tube 206 and engages with the primary tube cap 218 to prevent the light tube 206 from coming out completely if the primary tube 203 was to be submerged too far into the water. The cross-sectional shape of the primary tube 203 and/or the tube opening 227 can maintain alignment of the light tube 206 within the primary tube.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially. The word substantially can be based upon manufacturing tolerances as understood by those of skill in the art.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An illuminated boat loader for a watercraft trailer comprising:
   a primary tube extending between a first end and a second end, the primary tube configured to be coupled to the watercraft trailer at the second end; and
   a light tube configured to move within the primary tube, the light tube comprising:
      one or more light elements extending along a portion of the light tube at a first end of the light tube; and
      a float attached to the light tube at a second end of the light tube;
   wherein the first end of the light tube extends outward from the first end of the primary tube exposing the one or more light elements as the primary tube is submerged in water and retracts into the primary tube as the primary tube is removed from the water;
   wherein the primary tube comprises a channel extending along a portion of the primary tube and the light tube comprises a tab extending radially outward from the second end of the light tube and engaged with the channel to maintain alignment of the light tube in the primary tube.

2. The boat loader of claim 1, wherein the light tube comprises a light tube top sealing the first end of the light tube and a light tube base sealing the second end of the light tube base.

3. The boat loader of claim 2, wherein a light tube cap is attached to the first end of the light tube over the light tube top.

4. The boat loader of claim 3, wherein the light tube cap comprises one or more light element.

5. The boat loader of claim 4, wherein the one or more light element is electrically coupled to a lighting system of the trailer through the light tube top.

6. The boat loader of claim 2, wherein the float is attached to the light tube base by an adhesive.

7. The boat loader of claim 6, wherein the float is attached in a recess of the light tube base.

8. The boat loader of claim 6, wherein the float comprises a closed cell foam.

9. The boat loader of claim 2, comprising power connection wiring configured to connect to a lighting system of the trailer, the power connection wiring coupled to the one or more light elements and extending through the light tube base and the float.

10. The boat loader of claim 1, comprising a light strip including the one or more light elements.

11. The boat loader of claim 10, wherein the light strip is mounted inside the light tube.

12. The boat loader of claim 11, wherein the light tube is a clear light tube.

13. The boat loader of claim 12, wherein the light tube comprises polycarbonate.

14. The boat loader of claim 11, wherein the light strip is attached to an inner surface of the light tube.

15. The boat loader of claim 1, wherein the primary tube comprises a primary tube cap attached to the first end of the primary tube, wherein the light tube passes through a tube opening in the primary tube cap.

16. The boat loader of claim 15, wherein the tube opening substantially centers the light tube in the primary tube.

17. The boat loader of claim 1, wherein the tab is a screw extending through the channel to the second end of the light tube.

18. The boat loader of claim 17, wherein the light tube comprises a light tube base attached to the second end of the light tube base and the screw is engaged with the light tube base.

19. The boat loader of claim 1, wherein the lighting elements are light emitting diodes.

* * * * *